United States Patent [19]

Funahashi et al.

[11] Patent Number: 4,999,497

[45] Date of Patent: Mar. 12, 1991

[54] RADIATION IMAGE READ-OUT AND REPRODUCING METHOD AND APPARATUS

[75] Inventors: Takeshi Funahashi; Hiroshi Tanaka, both of Kanagawa, Japan

[73] Assignee: Fuji Photo Film Co., Ltd., Kanagawa, Japan

[21] Appl. No.: 324,862

[22] Filed: Mar. 17, 1989

[30] Foreign Application Priority Data

Mar. 19, 1988 [JP] Japan .................................. 63-66739
Oct. 12, 1988 [JP] Japan ................................ 63-256411

[51] Int. Cl.$^5$ .............................................. G03B 42/00
[52] U.S. Cl. ............................ 250/327.2; 364/413.13
[58] Field of Search .................... 250/327.2, 484.1 B; 364/413.13, 413.23, 413.26

[56] References Cited

U.S. PATENT DOCUMENTS

| | | | |
|---|---|---|---|
| 4,302,672 | 11/1981 | Kato et al. | 250/327.2 |
| 4,310,886 | 1/1982 | Kato et al. | 364/413.13 |
| 4,591,922 | 5/1986 | Takano et al. | 250/327.2 |
| 4,602,156 | 7/1986 | Asai et al. | 250/327.2 |
| 4,603,254 | 7/1986 | Takano et al. | 250/327.2 |
| 4,641,242 | 2/1987 | Kimura | 364/413.23 |
| 4,739,480 | 4/1988 | Oono et al. | 364/413.13 |
| 4,851,984 | 7/1989 | Doi et al. | 364/413.23 |

Primary Examiner—Constantine Hannaher
Assistant Examiner—Edward J. Glick
Attorney, Agent, or Firm—Sughrue, Mion, Zinn, Macpeak & Seas

[57] ABSTRACT

A radiation image read-out and reproducing method comprises the steps of reading out a radiation image, carrying out image processing when necessary, and thereafter obtaining a reproduced image. In the course of obtaining a second reproduced image to be compared with a first reproduced image which was obtained in the past, a read-out condition and/or an image processing condition, which is used for obtaining the second reproduced image, is adjusted on the basis of image information corresponding to the first reproduced image so that the second reproduced image has approximately the same gradation and approximately the same sensitivity as the first reproduced image. Image read out is carried out by using the adjusted read-out condition, and/or image processing is carried out by using the adjusted image processing condition.

6 Claims, 7 Drawing Sheets

RADIATION IMAGE READ-OUT AND REPRODUCING METHOD AND APPARATUS

BACKGROUND OF THE INVENTION

1. Field of the Invention

This invention relates to a radiation image read-out and reproducing method for obtaining an image signal by reading out a radiation image from a recording medium on which the radiation image has been recorded, and reproducing a visible image by use of the image signal, and an apparatus for carrying out the method. This invention particularly relates to a radiation image read-out and reproducing method which is suitable for ascertaining a change in density or the like between radiation images of the same object.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value designed so as to match the type of image processing to be carried out, the X-ray image is read out from the X-ray film and converted into an electric signal, and the electric signal (image signal) is image-processed and then used for reproducing the X-ray image as a visible image on a copy photograph or the like. In this manner, a visible image having good image quality with high contrast, high sharpness, high graininess or the like can be reproduced.

Also, when certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored during exposure to the radiation. A phosphor exhibiting such properties is referred to as a stimulable phosphor. As disclosed in U.S. Pat. Nos. 4,258,264, 4,276,473, 4,315,318 and 4,387,428 and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object such as the human body in order to store a radiation image of the object thereon, and is then scanned with stimulating rays, such as a laser beam, which causes it to emit light in proportion to the amount of energy stored during exposure to the radiation. The light emitted by the stimulable phosphor sheet upon stimulation thereof is photoelectrically detected and converted into an electric image signal, and by using the image signal the radiation image of the object is reproduced as a visible image on a recording material such as a photographic film, a display device such as a cathode ray tube (CRT), or the like.

Radiation image recording and reproducing systems which use stimulable phosphor sheets are advantageous over conventional radiography using silver halide photographic materials in that images can be recorded even when the energy intensity of the radiation to which the stimulable phosphor sheet is exposed varies over a wide range. More specifically, since the amount of light emitted upon stimulation after the radiation energy is stored on the stimulable phosphor varies over a wide range and is proportional to the amount of energy stored during exposure to the radiation, it is possible to obtain an image having a desirable density regardless of the energy intensity of the radiation to which the stimulable phosphor sheet was exposed, by setting an appropriate read-out gain when detecting the emitted light and converting it into an electric signal to be used in reproducing a visible image on a recording material or a display device.

In order to ultimately obtain a reproduced image having the best image quality, a novel radiation image recording and reproducing system has been proposed in, for example, U.S. Pat. No. 4,572,060. The proposed radiation image recording and reproducing system is constituted such that a preliminary read out is carried out by exposing a stimulable phosphor sheet, on which a radiation image has been stored, to a light beam having a comparatively low level of energy, thereby to release part of the energy stored during exposure to radiation. Based on a preliminary read-out image signal obtained by the preliminary read out, information such as the intensity or the dynamic range of the radiation which was irradiated onto the stimulable phosphor sheet is ascertained. Thereafter, the final read out is carried out for reading out the radiation image from the stimulable phosphor sheet and obtaining the image signal, which is to be used for reproducing a visible image, by exposing the stimulable phosphor sheet to a light beam having a higher level of energy than the level of energy of the light beam used in the preliminary read out. Based on the ascertained information, a read-out condition for the final read out and/or an image processing condition for image processing of the image signal obtained by the final read out is adjusted automatically.

The term "read-out condition" as used herein means generically various conditions during image read out which affect the sensitivity and the gradation with which a reproduced image is obtained. For example, the term "read-out condition" means a read-out gain, a scale factor, or the power of a light beam used for image read out. Also, the term "image processing condition" as used herein means generically various conditions in image processing, which affect the sensitivity and the gradation with which a reproduced image is obtained. For example, the term "image processing condition" means the condition of scale conversion of an image signal.

The term "level of energy of a light beam" as used herein means the level of energy of the light beam to which the stimulable phosphor sheet is exposed per unit area. In cases where the energy of light emitted by the stimulable phosphor sheet depends on the wavelength of the light beam, i.e. has a distribution of sensitivity to the wavelength, the term "energy level of a light beam" means the weighted energy level which is calculated by weighting the level of energy of the light beam, to which the stimulable phosphor sheet is exposed per unit area, with the sensitivity to the wavelength. In order to change the level of the light beam, light beams of different wavelengths may be used, the intensity of a light beam produced by a laser beam source or the like may be changed, or the intensity of a light beam may be changed by moving a ND filter or the like into and out of the optical path of the light beam. Alternatively, the density of scanning may be changed by changing the diameter of a light beam, or the speed of scanning with a light beam may be changed.

There has also been proposed a system wherein, preliminary read out is not carried out, the image signal obtained by the image read out which corresponds to the aforesaid final read out is analyzed, and an image processing condition to be used in image processing of the image signal is adjusted appropriately on the basis of the results of analysis of the image signal. The method of adjusting an image processing condition appropriately based on said image signal is applicable to the cases where an image signal is obtained from a radiation image recorded on a recording medium such as a conventional X-ray film, as well as to the system using the stimulable phosphor sheet.

In the aforesaid systems, a read-out condition and/or an image processing condition is adjusted so that each reproduced image has the best quality. Therefore, the aforesaid systems are suitable for viewing each reproduced image. However, in cases where images are obtained by using different read-out conditions and/or different image processing conditions, a change in density between, for example, an image of an object which was recorded in the past and stored and an image which represents the current state of the same object cannot be ascertained accurately when the two images are compared with each other in order to investigate a change in density therebetween.

An example of the aforesaid problem will hereinbelow be described with reference to FIGS. 7A, 7B, 8A and 8B.

Figure 7A:
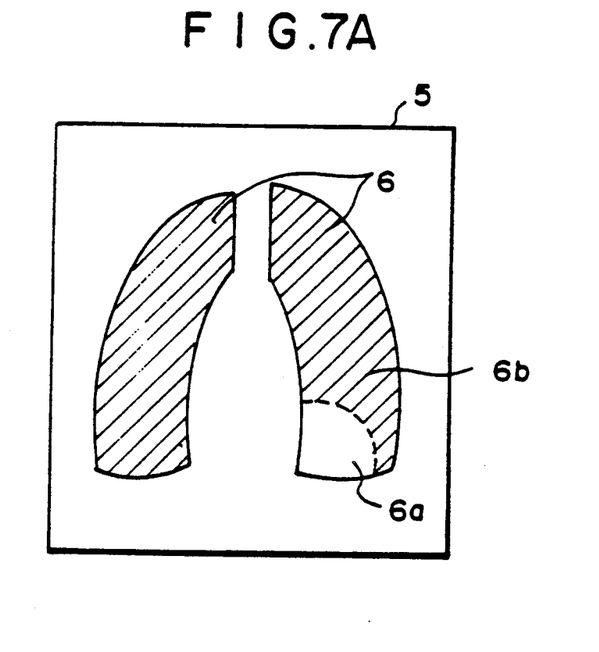
FIG. 7A is a schematic view showing a radiation image of part of the human body, which image has been reproduced and displayed.

FIG. 7A is a schematic view showing a radiation image 6 of part (in this case, the frontal chest) of the human body, which image has been reproduced on a photographic film 5. A normal portion 6b in the radiation image 6 has an approximately uniform level of density, whereas a portion 6a affected by a disease has a level of density lower than the density at the normal portion 6b.

Figure 7B:
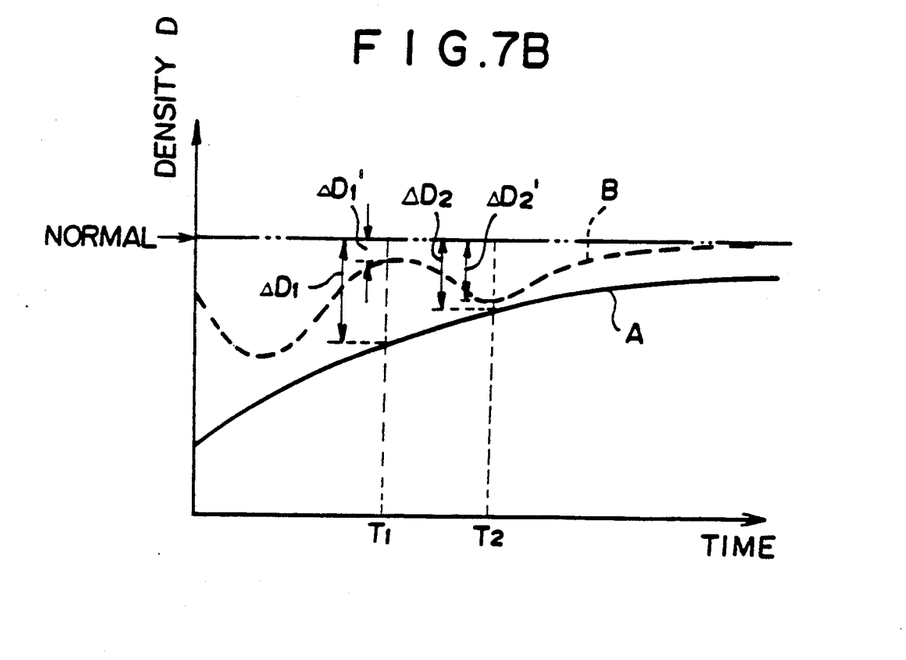
FIG. 7B is a graph showing a change in density at part of the object shown in FIG. 7A, which change was investigated by recording and reproducing a plurality of radiation images of the object shown in FIG. 7A with the passage of time.

FIG. 7B is a graph showing a change in the abnormal density level at the portion 6a affected by the disease, which change was investigated by recording and reproducing a plurality of radiation images of the object shown in FIG. 7A with the passage of time. The disease is being cured with the passage of time. The curve A indicates ideal levels of density at which the portion 6a affected by the disease is to be reproduced when the disease is being cured. However, in cases where image read out and/or image processing is carried out so that each of the reproduced images has best quality, abnormal levels of density at the portion 6a affected by the disease among ultimately reproduced images are often represented by the curve B because of a change in the density at the portion 6a affected by the disease and other disturbing factors. In this case, the degree of the disease is judged based on the difference between the density at the portion 6a affected by the disease and the density at the normal portion 6b. Specifically, from an image which was recorded at the time T1, a density difference $\Delta D1$ between the normal level of density and the level of density on the curve A should be detected. The density difference $\Delta D1$ is large and indicates that the portion 6a has been very affected by the disease. However, there is the risk of a density difference $\Delta D1'$ between the normal level of density and the level of density on the curve B being detected. The density difference $\Delta D1'$ is small and indicates that the disease has been cured substantially. Also, from an image which was recorded at the time T2, a density difference $\Delta D2$ ($\Delta D2 < \Delta D1$) between the normal level of density and the level of density on the curve B should be detected. However, there is the risk of a density difference $\Delta D2'$ ($\Delta D2' > \Delta D1'$) between the normal level of density and the level of density on the curve B being detected. At the time T2, the disease has actually been cured to some extent as compared with the time T1, i.e. $\Delta D2 < \Delta D1$. However, there is a risk of judging that the disease became more serious as compared with the time T1, i.e. $\Delta D2' > \Delta D1'$.

Figure 8A:
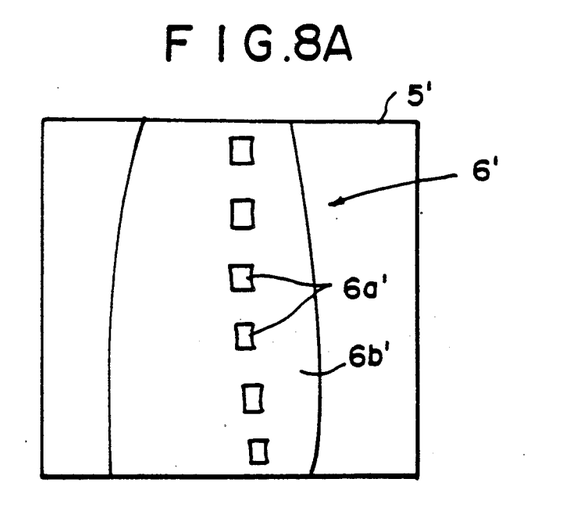
FIG. 8A is a schematic view showing a radiation image of part of the human body, which image has been reproduced and displayed.

FIG. 8A is a schematic view showing a radiation image 6' of part (in this case, sides of the vertebrae) of the human body, which image has been reproduced on a photographic film 5'. In cases where a disease which causes the density level at bone portions 6a' in the radiation image 6' to increase is diagnosed, judgment must be made based on the density at the bone portions 6a'. This is because, unlike the case shown in FIG. 7A, the bone portions 6a' and a portion 6b' outside of the bones are different organs, and a difference in density therebetween cannot be utilized for judgment.

However, when a plurality of reproduced images as shown in FIG. 8A are obtained, a read-out condition and/or an image processing condition is generally adjusted so that the density at the bone portions 6a' is constant among the reproduced images.

Figure 8B:
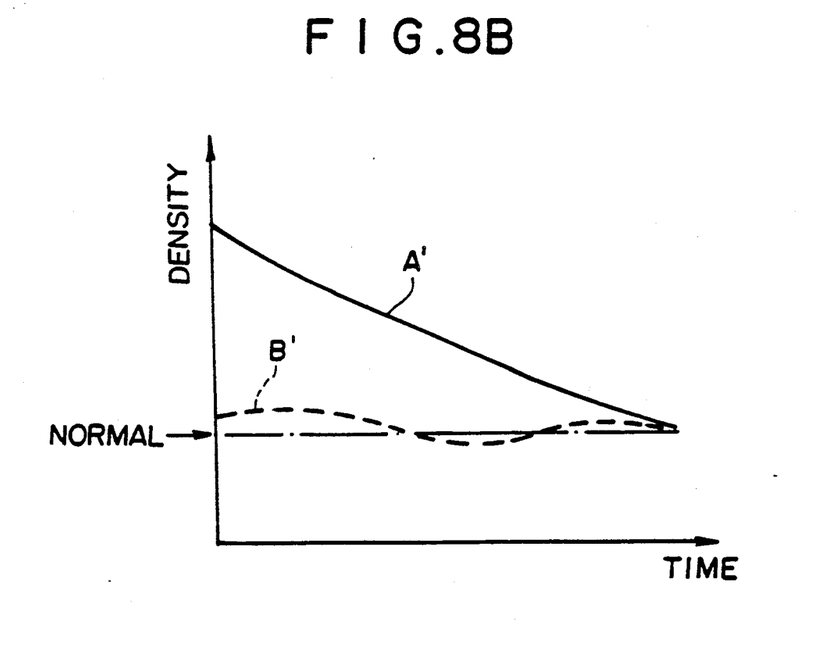
FIG. 8B is a graph showing a change in density at part of the object shown in FIG. 8A, which change was investigated by recording and reproducing a plurality of radiation images of the object shown in FIG. 8A with the passage of time.

FIG. 8B is a graph showing a change in abnormal density level at the bone portion 6a' which change was investigated by recording and reproducing a plurality of radiation images of the object shown in FIG. 8A with the passage of time. As in the case shown in FIG. 7B, the disease is being cured with the passage of time. The curve A' indicates ideal levels of density at which the bone portions 6a' are to be reproduced when the disease is being cured. However, in cases where image read out and/or image processing is carried out so that the levels of density at the bone portions 6a' are identical among the reproduced images, the density at the bone portions 6a' is reproduced along the curve B' at approximately the same levels as the normal level of density, except for effects of disturbing factors. In this case, abnormality in density at the bone portions 6a' cannot be detected.

SUMMARY OF THE INVENTION

The primary object of the present invention is to provide a radiation image read-out and reproducing method, which provides such reproduced images that a change among the reproduced images can be ascertained accurately.

Another object of the present invention is to provide an apparatus for carrying out the radiation image read-out and reproducing method.

The present invention provides a radiation image read-out and reproducing method for reading out a radiation image, carrying out image processing when necessary, and thereafter obtaining a reproduced image, wherein the improvement comprises the the steps of, in the course of obtaining a second reproduced image to be compared with a first reproduced image which was obtained in the past:

(i) adjusting a read-out condition and/or an image processing condition, which is used for obtaining said second reproduced image, on the basis of image information corresponding to said first reproduced image so that said second reproduced image has approximately the same gradation and approximately the same sensitivity as said first reproduced image, and (ii) carrying out image read out by using the adjusted read-out condition and/or carrying out image processing by using the adjusted image processing condition.

The term "image information" as used herein means information serving to define the gradation and the sensitivity of an image, which was obtained in the past, such as the image recording condition, the read-out condition and the image processing condition which were used for obtaining the past image. For example, an image signal which represents the past image may be stored and referred to directly when the second reproduced image is to be obtained, and a read out condition and/or an image processing condition for use in obtaining the second reproduced image may be adjusted so as to obtain an image signal having approximately the same gradation and approximately the same sensitivity as the image signal which represents the past image. Alternatively, information obtained by processing the read-out condition or the like used for obtaining the past image may be stored, and the read-out condition or the like for use in obtaining the second reproduced image may be adjusted based on the information.

In cases where the same image recording condition is used for the same object, for example, in cases where the voltage applied to an X-ray tube is the same, i.e. the quality of radiation (X-rays) is the same, and the radiation dose to the object is the same in a system utilizing X-rays as the radiation, image read out and/or image processing for obtaining the second reproduced image may be carried out by directly utilizing, for example, the read-out condition and/or the image processing condition, which was used for obtaining the past image, as the image information.

However, in some systems, the radiation dose changes even though the quality of radiation is the same, or both the quality and the dose of radiation fluctuate. For such systems, for example, the radiation image read-out and reproducing method in accordance with the present invention may be modified so that:

(a) two radiation images from which said first reproduced image and said second reproduced image are obtained have density reference portions corresponding to each other, (b) said image information is constituted of a density value at the density reference portion of the radiation image from which said first reproduced image was obtained, and a read-out condition and/or an image processing condition which was used for obtaining said first reproduced image, and (c) in the course of obtaining said second reproduced image, said image read out and/or said image processing is carried out by adjusting sensitivity and/or gradation with respect to said read-out condition and/or said image processing condition, which constitutes part of said image information of said first reproduced image, so that the density value at the density reference portion of the radiation image, from which said second reproduced image is obtained, becomes approximately equal to said density value which constitutes part of said image information of said first reproduced image.

The term "density reference portion" as used herein means an image region capable of being used for matching density between two images, such as a background image portion upon which the radiation impinged directly without passing through an object, or an image portion representing an image of a metal plate having a predetermined thickness. In cases where the quality of the radiation used during image recording is constant and only the radiation dose is changed between radiation images, a single density reference portion, for example, only the background image portion on each radiation image may be employed. In cases where both the quality and the dose of the radiation are changed between radiation images and the gradation is to be adjusted, it is necessary to employ a plurality of density reference portions having different densities on each radiation image. In such cases, the background image portion and the image portion representing an image of a metal plate having a predetermined thickness may be employed as the density reference portions on each radiation image. Alternatively, image portions representing two metal plates having different thicknesses may be employed as the density reference portions on each radiation image. The radiation images having the density reference portions need not necessarily be visible images.

Also, the term "density value" as used herein means the value with respect to the density of the density reference portion in cases where the radiation images from which the first reproduced image and the second reproduced image are obtained are visible images, for example, X-ray images recorded on X-ray films by exposing the X-ray films to X-rays. In cases where the radiation images are invisible images, for example, images stored on stimulable phosphor sheets by exposing the stimulable phosphor sheets to radiation such as X-rays, the term "density value" as used herein means the value which indirectly represents the density which will be obtained when each radiation image is converted into a visible image, for example, the value of the amount of light emitted by the density reference portion of the radiation image stored on each stimulable phosphor sheet in proportion to the amount of energy stored during exposure to the radiation.

The present invention also provides a radiation image read-out and reproducing apparatus comprising an image read-out means for detecting an image signal by reading out a radiation image from a recording medium on which the radiation image has been recorded, an operating means for carrying out image processing of the image signal, and a reproduction means for obtaining a reproduced image by use of the image signal, wherein the improvement comprises the provision of:

(i) an ID information input means for entering ID information which gives specifics about an radiation image, (ii) an ID information storage means for storing several pieces of ID information which were entered from said ID information input means in the past, and (iii) an ID information retrieval means for retrieving past ID information, which is the same as ID information currently entered from said ID information input means, from the ID information stored in said ID information storage means, wherein, when said past ID information has been retrieved by said ID information retrieval means, a read-out condition to be used for detecting an image signal from a recording medium in said image read-out means and/or an image processing condition to be used for carrying out image processing of the image signal in said operating means is adjusted on the basis of image information, which corresponds to said past ID information, so as to obtain a second reproduced image having approximately the same gradation and approximately the same sensitivity as a first reproduced image which has been obtained by said reproduction means and which corresponds to said past ID information, and image read out for obtaining said second reproduced image is carried out by using the adjusted read-out condition and/or image processing for obtaining said second reproduced image is carried out by using the adjusted image processing condition.

The term "ID information" as used herein means information such as the name of the object recorded, or the portion of an object the image of which was recorded. The ID information is used to identify the radiation image recorded in the past which is to be compared with a radiation image recorded currently.

With the radiation image read-out and reproducing method in accordance with the present invention, in the course of obtaining a second reproduced image to be compared with a first reproduced image which was obtained in the past, a read-out condition and/or an image processing condition, which is used for obtaining the second reproduced image, is adjusted so that the second reproduced image has approximately the same gradation and approximately the same sensitivity as the first reproduced image. Thereafter, image read out for obtaining the second reproduced image is carried out by using the adjusted read-out condition, and/or image processing for obtaining the second reproduced image is carried out by using the adjusted image processing condition. Therefore, a change in density or the like among a plurality of radiation images can be ascertained accurately by comparing the radiation images with one another.

Also, with the radiation image read-out and reproducing method in accordance with the present invention, radiation images from which the first reproduced image and the second reproduced image are obtained are provided with the density reference portions, and a read-out condition and/or an image processing condition to be used for obtaining the second reproduced image is adjusted so that the density values at the density reference portions becomes approximately equal to each other. Therefore, even when the dose or the quality of the radiation was different between the image recording steps for the radiation images, it is possible to obtain the second reproduced image having approximately the same gradation and approximately the same sensitivity as the first reproduced image. Accordingly, the first reproduced image and the second reproduced image can be compared accurately.

With the radiation image read-out and reproducing apparatus in accordance with the present invention, several pieces of ID information which were entered from the ID information input means in the past and which give specifics about radiation images recorded and read out in the past are stored in the ID information storage means. Therefore, when ID information which gives specifics about a radiation image recorded currently is entered from the ID information input means, it is possible to know based on said ID information whether a radiation image which is to be compared with the radiation image recorded currently, for example, a radiation image of the same object and of the same portion of the object as the radiation image recorded currently, was or was not read out and image-processed in the past. In cases where a radiation image which is to be compared with the radiation image recorded currently was read out in the past, a read-out condition and/or an image processing condition for the radiation image recorded currently is adjusted on the basis of image information about the past radiation image so as to obtain a second reproduced image having approximately the same gradation and approximately the same sensitivity as a first reproduced image which has been obtained from the past radiation image. Image read out for obtaining the second reproduced image is carried out by using the adjusted read-out condition, and/or image processing for obtaining the second reproduced image is carried out by using the adjusted image processing condition. Therefore, a change in density or the like among a plurality of radiation images of the same object can be ascertained accurately by comparing the radiation images with one another.

DESCRIPTION OF THE PREFERRED EMBODIMENTS

The present invention will hereinbelow be described in further detail with reference to the accompanying drawings.

Figure 1:
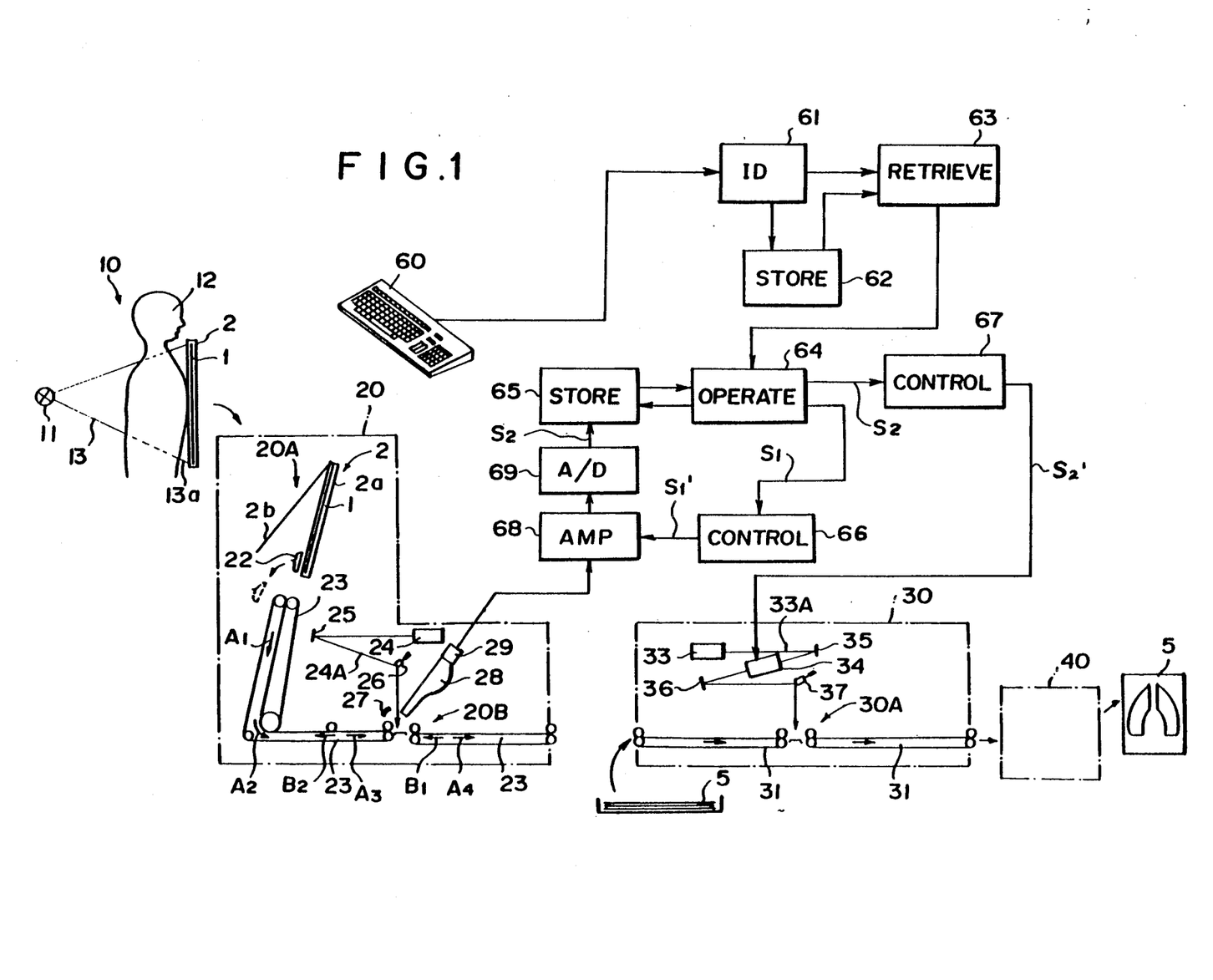
FIG. 1 is a schematic view showing a radiation image recording and reproducing system wherein an embodiment of the radiation image read-out and reproducing apparatus in accordance with the present invention is employed.

With reference to FIG. 1, an embodiment of the radiation image read-out and reproducing apparatus in accordance with the present invention utilizes a stimulable phosphor sheet.

A stimulable phosphor sheet 1 is housed in a cassette 2 which is permeable to radiation and impermeable to light. In this state, the stimulable phosphor sheet 1 is subjected to image recording in an image recording apparatus 10. Specifically, the cassette 2 in which the stimulable phosphor sheet 1 is housed faces a radiation source 11, which may be constituted of an X-ray source or the like, with an object 12 intervening between the cassette 2 and the radiation source 11. Radiation 13 is then irradiated from the radiation source 11 to the object 12, and the stimulable phosphor sheet 1 is exposed to radiation 13a which has passed through the object 12. In this manner, a radiation image of the object 12 is stored on the stimulable phosphor sheet 1.

After the radiation image has been stored on the stimulable phosphor sheet 1 in the image recording apparatus 10, the cassette 2 in which the stimulable phosphor sheet 1 is housed is taken out of the image recording apparatus 10 and fed into a cassette holding section 20A which is provided in an image read-out means 20 of the radiation image read-out and reproducing apparatus.

Before or after the cassette 2 is fed into the cassette holding section 20A, ID information giving specifics about the object 12, such as the name of the object 12, or the portion of the object 12 the image of which was recorded, is entered from a keyboard 60 serving as an ID information input means. The ID information is fed into an ID information storage means 62 via an ID information operating means 61, and is stored in the ID information storage means 62. The ID information is also fed into an ID information retrieval means 63. The ID information retrieval means 63 compares the ID information with several pieces of ID information which were stored in the ID information storage means 62 in the past, and investigates whether ID information stored in the past and giving specifics about a radiation image which is to be compared with the radiation image recorded currently, for example, a radiation image of the same object 12 and of the same portion of the object 12 as the radiation image recorded currently, is or is not present. The ID information retrieval means 63 generates a signal representing the presence or absence of the ID information which was stored in the past and which is the same as the ID information giving specifics about the radiation image recorded currently. In cases where the ID information which was stored in the past and which is the same as the ID information giving specifics about the radiation image recorded currently is present, the signal also represents which image signal detected in the past is identified by the ID information which was stored in the past and which is the same as the ID information giving specifics about the radiation image recorded currently. The signal generated by the ID information retrieval means 63 is fed into an operating means 64. Based on the signal received from the ID information retrieval means 63, the operating means 64 reads, from an image signal storage means 65, information about the gradation and the sensitivity of the image signal detected in the past and identified by the ID information which was stored in the past and which is the same as the ID information giving specifics about the radiation image recorded currently. Said information about the gradation and the sensitivity of the image signal has been stored in the image signal storage means 65 in association with the image signal. On the basis of said information read from the image signal storage means 65, the operating means 64 generates a signal S1 which specifies a read-out condition so that a reproduced image obtained from the radiation image recorded currently has approximately the same gradation and approximately the same sensitivity as the reproduced image obtained from the image signal identified by the ID information which was stored in the past and which is the same as the ID information giving specifics about the radiation image recorded currently. The operating means 64 feeds the read-out condition signal S1 into a read-out condition control means 66. The operating means 64 also carries out image processing of an image signal detected from the stimulable phosphor sheet 1. Furthermore, the operating means 64 generates an image signal S2 on the basis of the image-processed image signal, and feeds the image signal S2 into a reproduction control means 67.

The extent to which the gradation and the sensitivity of the reproduced image obtained from the radiation image recorded currently should be matched to the gradation and the sensitivity of the reproduced image obtained from the radiation image recorded in the past, varies depending on the image recording condition, such as the portion of the object the image of which was recorded (for example, the head, the abdomen or the chest of the human body) or the image recording method (for example, ordinary image recording, contrasted image recording, or tomography), and depending on the purpose of image recording.

In cases where the ID information which is the same as the ID information giving specifics about the radiation image recorded currently was not entered into the ID information storage means 62, a read-out condition and an image processing condition for the radiation image recorded currently are adjusted so as to obtain a reproduced image having best quality from said radiation image.

The image read-out means 20 is provided with the cassette holding section 20A for releasably holding the cassette 2, and a read-out section 20B for reading out the radiation image which has been stored on the stimulable phosphor sheet 1. After the cassette 2 is fed into the cassette holding section 20A, a cover member 2b of the cassette 2 is opened. A suction means 22 provided in the cassette holding section 20A is then moved from the position indicated by the broken line to the position indicated by the solid line. The suction means 22 takes the stimulable phosphor sheet 1 out of the cassette body 2a cassette 2, and transfers the stimulable phosphor sheet 1 to part of a sheet conveyance means 23 in the vicinity of the cassette 2. The sheet conveyance means 23 conveys the stimulable phosphor sheet 1 in the directions indicated by the arrows A1, A2 and A3 into the read-out section 20B.

In the read-out section 20B, a laser beam 24A produced by a laser beam source 24 serving as a stimulating ray source is caused to scan the stimulable phosphor sheet 1 by an optical system, which comprises a mirror 25 or the like, and a light deflector constituted of a galvanometer mirror 26 or the like. When the stimulable phosphor sheet 1 is scanned by the laser beam 24A, the scanned portion of the stimulable phosphor sheet 1 emits light in proportion to the amount of energy stored during exposure to the radiation. The emitted light enters a light guide member 28 directly or after being reflected by a reflection mirror 27. The light which has entered the light guide member 28 is guided through repeated total reflection inside of the light guide member 28. The guided light impinges upon a photomultiplier 29 serving as a photodetector, and is converted photoelectrically. A signal thus obtained is logarithmically amplified by a logarithmic amplifier 68, and the amplified signal is converted by an A/D converter 69 into a digital image signal S2 proportional to the logarithmic value of the amount of the light emitted by the stimulable phosphor sheet 1. The digital image signal S2 is stored in the image signal storage means 65. In the course of image read out, a read-out control signal S1' is generated by the read-out condition control means 66 on the basis of the read-out condition signal S1, and is fed into the logarithmic amplifier 68. On the basis of the read-out control signal S1', the logarithmic amplifier 68 adjusts the read-out sensitivity and gradation. By using the adjusted conditions, the photoelectrically converted signal is amplified logarithmically.

In cases where preliminary read out should be carried out prior to the image read-out step (final read out) described above, preliminary read out may be carried out by scanning the stimulable phosphor sheet 1 with a weak laser beam while the stimulable phosphor sheet 1 is being moved in the directions indicated by the arrows A3 and A4. Thereafter, the stimulable phosphor sheet 1 may be returned in the directions indicated by the arrows B1 and B2, and then final read out may be carried out while the stimulable phosphor sheet 1 is being moved in the directions indicated by the arrows A3 and A4.

The image signal which has been stored in the image signal storage means 65 and which represents the radiation image recorded and read out currently is read therefrom by the operating means 64. In cases where the ID information which was stored in the past and which is the same as the ID information giving specifics about the radiation image recorded and read out currently is present, the operating means 64 carries out image processing so that a reproduced image obtained from the radiation image recorded and read out currently has approximately the same gradation and approximately the same sensitivity as the reproduced image obtained from the image signal identified by the ID information which was stored in the past and which is the same as the ID information giving specifics about the radiation image recorded and read out currently. The image-processed image signal is then stored in the image signal storage means 65. In cases where the ID information which is the same as the ID information giving specifics about the radiation image recorded and read out currently is not present, the operating means 64 carries out image processing so as to obtain a reproduced image having the best quality from said radiation image.

After the image signal S2 is detected in the image read-out means 20, a visible radiation image is reproduced on a photographic film 5 from the image signal S2 in a reproduction means 30. Image reproduction will be described hereinbelow.

As described above, the image signal S2 detected in the image read-out means 20 is image-processed in the operating means 64 and stored in the image signal storage means 65. The image-processed image signal S2 is read by the operating means 64 from the image signal storage means 65, and then fed into the reproduction control means 67. The reproduction control means 67 generates a reproduction signal S2' on the basis of the image signal S2, and feeds the reproduction signal S2' into a light modulator 34.

A single photographic film 5 is fed into the reproduction means 30, and conveyed by a film conveyance means 31 in the directions indicated by the arrows. When the photographic film 5 has been brought to an image reproducing section 30A, a laser beam 33A produced by a laser beam source 33 serving as a reproducing light source is caused to scan the photographic film 5 via a mirror 35, the light modulator 34, a mirror 36, and a galvanometer mirror 37. In the course of the scanning step, the reproduction signal S2' is fed into the light modulator 34, and the intensity of the laser beam 33A is modulated in accordance with the reproduction signal S2'. Therefore, the radiation image which is represented by the image signal S2 is reproduced on the photographic film 5. The photographic film 5 which has passed through the image reproducing section 30A is subjected to development and fixing in a developing apparatus 40, and the radiation image is converted into a visible image.

As described above, in cases where a radiation image identified by the ID information which is the same as the ID information giving specifics about the radiation image from which the visible image has been reproduced currently was read out in the past, the read-out condition used for image read out in the image read-out means 20 and the image processing condition used for image processing in the operating means 64 are adjusted so that the visible image reproduced currently has approximately the same gradation and approximately the same sensitivity as the visible image reproduced from the past radiation image identified by the ID information which is the same as the ID information giving specifics about the radiation image from which the visible image has been reproduced currently. Therefore, the visible image reproduced currently can be compared with the visible image reproduced from the radiation image of the same object, which was read out in the past, and a change in density at part of the image between the two visible images can be ascertained accurately.

In the aforesaid embodiment, both the read-out condition and the image processing condition are adjusted. However, only one of either the read-out condition and the image processing condition may be adjusted so that the visible image reproduced currently has approximately the same gradation and approximately the same sensitivity as the visible image reproduced from the past radiation image. For example, the image read-out step for the radiation image recorded currently may be carried out by using a predetermined read-out condition regardless of whether a past radiation image which is to be compared with the radiation image recorded currently is or is not present. Thereafter, in cases where the past radiation image which is to be compared with the radiation image recorded currently is present, image processing may be carried out so as to obtain a visible image having approximately the same gradation and approximately the same sensitivity as the visible image reproduced from the past radiation image. In cases where past radiation image which is to be compared with the radiation image recorded currently is not present, image processing may be carried out so as to obtain a visible image having best quality.

Figure 2A:
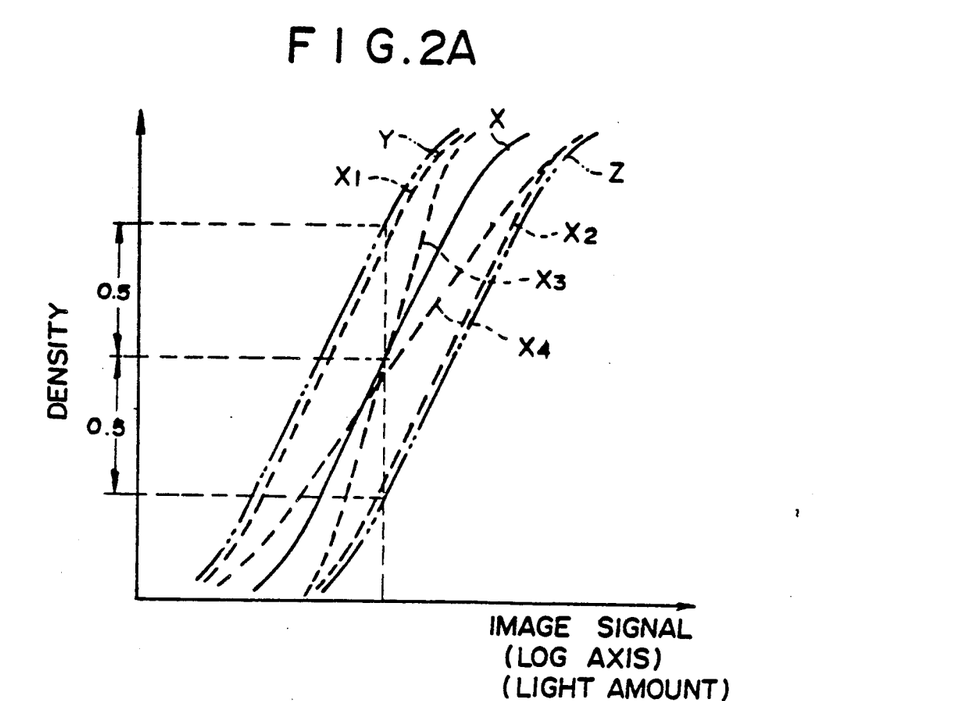
FIGS. 2A and 2B are graphs showing characteristic curves which represent relationships between image signals and density levels.

FIG. 2A is a graph showing characteristic curves which represent relationships between image signals (amounts of light emitted by stimulable phosphor sheets) and density levels of visible images reproduced ultimately in cases of FIGS. 7A and 7B wherein density differences ΔD between the normal portion and the portion affected by a disease are detected accurately.

The characteristic curves shown in FIG. 2A indicate an allowable range of error in gradation and sensitivity of the visible image reproduced currently in the case of the frontal chest radiation image described above with reference to FIGS. 7A and 7B. A characteristic curve X indicates the characteristics of a past image which is to be compared with a current image. The range sandwiched between a characteristic curve Y obtained by changing the image density by +0.5 (preferably by +0.2) and a characteristic curve Z obtained by changing the image density by −0.5 (preferably by −0.2) is the allowable range of error in gradation and sensitivity. Specifically, insofar as the gradation and the sensitivity are within the allowable range, only the sensitivity may be changed as indicated by characteristic curves X1 and X2 while the gradation is kept unchanged. Alternatively, the gradation may be changed as indicated by characteristic curves X3 and X4 while the sensitivity is kept unchanged, or both the gradation and the sensitivity may be changed. In this case, the differences in density between the normal portion 6b and the portion 6a affected by a disease (shown in FIG. 7A) on the current image and on the past image are compared with each other. Therefore, the allowable range of error is comparatively broad.

Figure 2B:
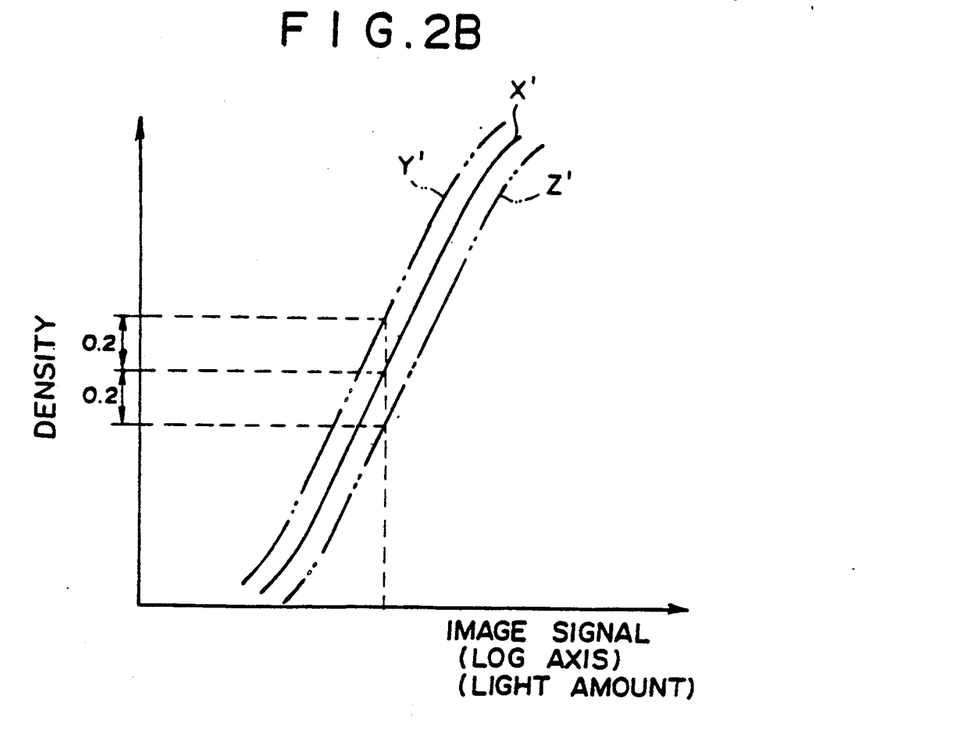

FIG. 2B shows characteristic curves which indicate an allowable range of error in gradation and sensitivity of the visible image reproduced currently in the case of the vertebra side radiation image described above with reference to FIGS. 8A and 8B.

A characteristic curve X' indicates the characteristics of a past image which is to be compared with a current image. The range sandwiched between a characteristic curve Y' obtained by changing the image density by +0.2 (preferably by +0.1) and a characteristic curve Z' obtained by changing the image density by −0.2 (preferably by −0.1) is the allowable range of error in gradation and sensitivity. As in the case of FIG. 2A, insofar as the gradation and the sensitivity are within the allowable range, only one of either the sensitivity and the gradation may be changed, or both of the sensitivity and the gradation may be changed. In this case, the differences in density at the bone portions 6a' (shown in FIG. 8A) between the current image and the past image are compared with each other. Therefore, the allowable range of error is narrower than in the case of FIG. 2A.

In the aforesaid embodiment, the information about the gradation and the sensitivity of the image signal detected from the past radiation image is stored. Based on the information, the read-out condition and the image processing condition to be used for obtaining a reproduced image are adjusted so that the reproduced image has approximately the same gradation and approximately the same sensitivity as the visible image reproduced from the image signal detected from the past radiation image. However, in cases where the dose or the quality of the radiation is changed in the image recording step, the read-out condition and/or an image processing condition may be adjusted as described below without using the information about the gradation and the sensitivity of the image signal detected from the past radiation image. Adjustment of the read-out condition to be used for final read out after carrying out preliminary read out in order to detect a preliminary read-out image signal Sp will be described hereinbelow.

An example of the adjustment in cases where the quality of the radiation used in the image recording step is kept unchanged and only the radiation dose is changed will first be described hereinbelow.

Figure 3A:
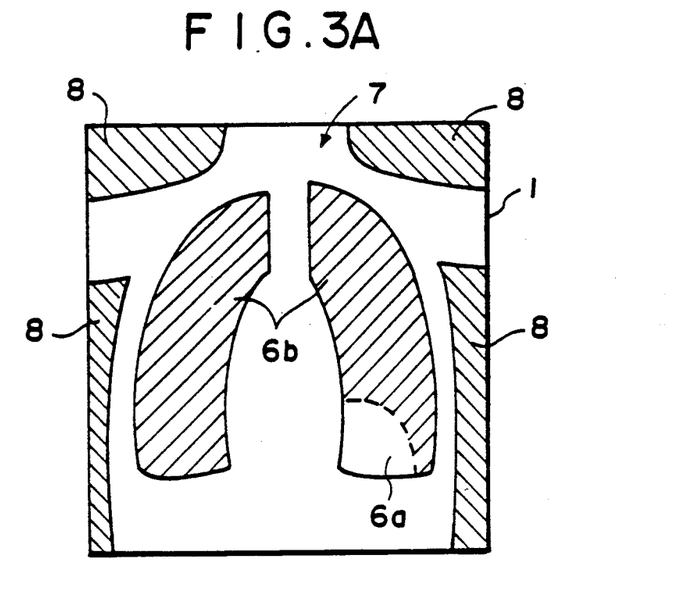
FIG. 3A is a schematic view showing a radiation image from which a reproduced image shown in FIG. 7A is obtained.

FIG. 3A shows a radiation image stored on a stimulable phosphor sheet 1, from which the reproduced image shown in FIG. 7A is obtained. In FIG. 3A, similar elements are numbered with the same reference numerals with respect to FIG. 7A.

The radiation image shown in FIG. 3A is composed of an object image portion 7 at which the image of the object is stored, and background image portions 8 upon which the radiation impinged directly without passing through the object in the image recording step.

Figure 3B:
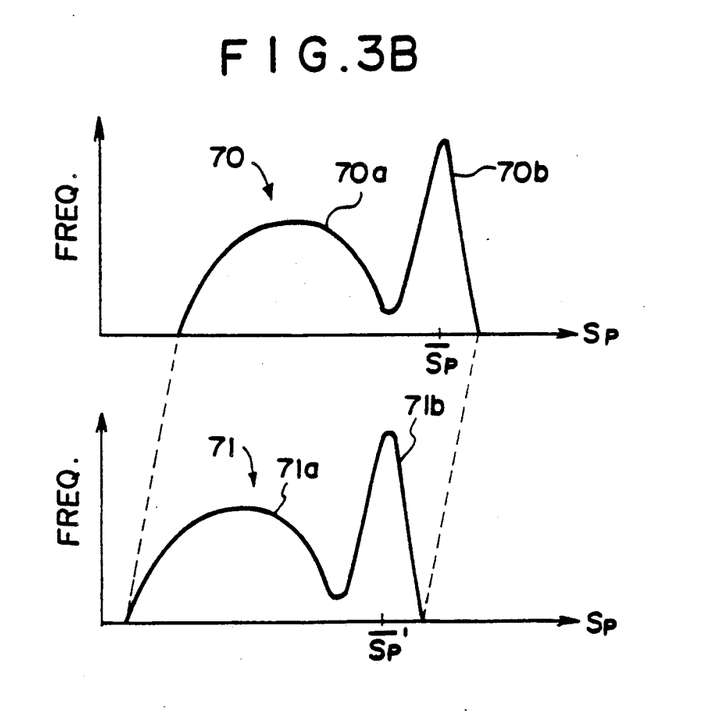
FIG. 3B is a pair of graphs showing a histogram of a preliminary read-out image signal detected from a past radiation image, and a histogram of a preliminary read-out image signal detected from a radiation image which is to be compared with the past radiation image.

FIG. 3B shows a histogram 70 of the preliminary read-out image signal Sp which is obtained by a preliminary read out from a past radiation image as shown in FIG. 3A and which is proportional to the logarithmic value of the amount of light emitted by a stimulable phosphor sheet 1 on which the past radiation image has been stored. FIG. 3B also shows a histogram 71 of the preliminary read-out image signal Sp which is obtained by preliminary read out from a current radiation image as shown in FIG. 3A to be compared with the past radiation image and which is proportional to the logarithmic value of the amount of light emitted by a stimulable phosphor sheet 1 on which the current radiation image has been stored. The preliminary read-out steps from the past and current radiation images are carried out by using identical read-out conditions. The horizontal axis of each graph shown in FIG. 3B indicates values of the preliminary read-out image signal Sp, and the vertical axis indicates the frequency of occurrence of the values of the preliminary read-out image signal Sp. The histograms 70 and 71 were obtained from the past and current radiation images of the same object which were recorded by using different radiation doses with the quality of the radiation being maintained the same.

The histogram 70 is composed of a portion 70a, which is constituted of the components of the preliminary read-out image signal Sp detected from the object image portion 7, and a portion 70b which is constituted of the components of the preliminary read-out image signal Sp detected from the background image portions 8. Also, the histogram 71 is composed of a portion 71a, which is constituted of the components of the preliminary read-out image signal Sp detected from the object image portion 7, and a portion 71b which is constituted of the components of the preliminary read-out image signal Sp detected from the background image portions 8. As shown in FIG. 3B, when the radiation dose is changed between the past and current radiation images, the histograms 70 and 71 which have the identical shapes and which are shifted with respect to each other along the horizontal axis (i.e. the Sp axis) are obtained. Accordingly, a mean value $\overline{Sp}$ (shown in FIG. 3B) of the components of the preliminary read-out image signal Sp, which were detected from the background image portions 8 of the past radiation image, is stored together with the information about the gradation and the sensitivity in final read out from the past radiation image. After the preliminary read-out image signal Sp has been detected from the current radiation image which is to be compared with the past radiation image, a mean value $\overline{SP'}$ (shown in FIG. 3B) of the components of the preliminary read-out image signal Sp, which have been detected from the background image portions 8 of the current radiation image, is calculated. The read-out condition for final read out from the current radiation image is adjusted so as to change the sensitivity corresponding to the past radiation image, whereas the gradation corresponding to the past radiation image is kept unchanged, so that the mean value $\overline{SP'}$ is matched with the mean value $\overline{Sp}$ i.e. so that the histogram 71 is shifted along the horizontal axis (i.e. the Sp axis) up to the position of the histogram 70. The characteristic values used to make the histogram 71 coincide with the histogram 70 by shifting the histogram 71 along the horizontal axis are not limited to the mean values $\overline{SP'}$ and $\overline{Sp}$ and may be, for example, a signal value at which the frequency of occurrence at the background image portions 8 is the largest, or the maximum signal value at the background image portions 8.

An example of the adjustment in cases where both the dose and the quality of the radiation used in the image recording step are changed will be described hereinbelow.

Figure 4A:
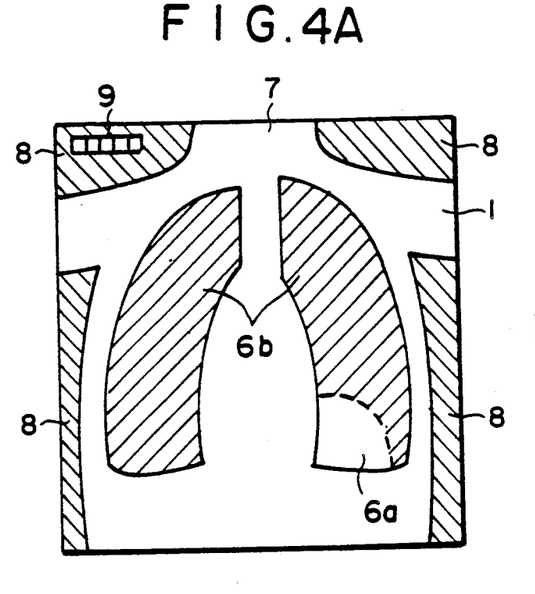
FIG. 4A is a schematic view showing a radiation image from which a reproduced image shown in FIG. 7A is obtained.

FIG. 4A shows a radiation image stored on a stimulable phosphor sheet 1, from which image the reproduced image shown in FIG. 7A is obtained. The radiation image shown in FIG. 4A is identical with the radiation image shown in FIG. 3A, except that the former includes a step-wedge image portion 9, i.e. an image portion recorded with radiation which has passed through a step wedge formed of aluminium. In FIG. 4A, similar elements are numbered with the same reference numerals with respect to FIG. 3A.

Figure 4B:
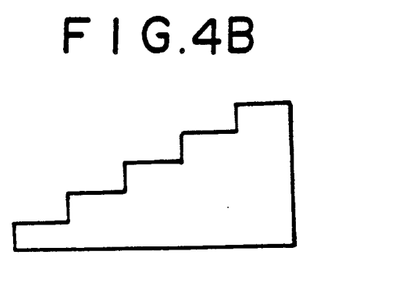
FIG. 4B is a schematic view showing an example of a step wedge.

FIG. 4B shows an example of the step wedge the image of which is recorded as the step-wedge image portion 9 in FIG. 4A. The step wedge is constituted of a plate the thickness of which is changed step-wise so that the radiation passing through the plate attenuates step-wise. The thickness of each step-like portion of the step wedge is determined in accordance with the transmittance with respect to the radiation. Therefore, the amount of light emitted by the step-wedge image portion 9 during exposure to stimulating rays changes step-wise in accordance with the change in thickness of the step wedge.

Figure 4C:
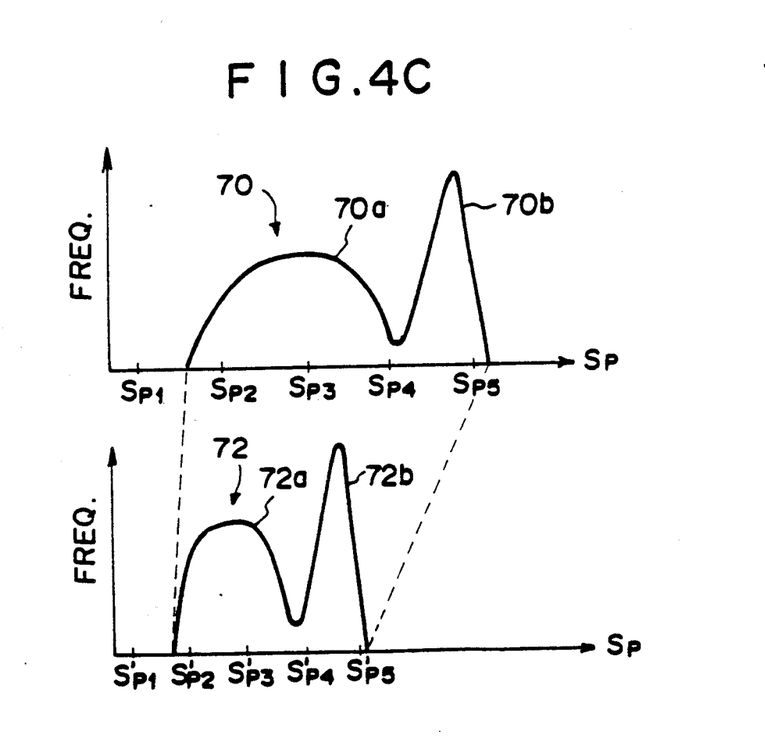
FIG. 4C is a pair of graphs showing a histogram of a preliminary read-out image signal detected from a past radiation image, and a histogram of a preliminary read-out image signal detected from a radiation image which is to be compared with the past radiation image.

FIG. 4C shows a histogram 70 of the preliminary read-out image signal Sp which is obtained by preliminary read out from a past radiation image as shown in FIG. 4A. This histogram is the same as the histogram 70 shown in FIG. 3B. FIG. 4C also shows a histogram 72 of the preliminary read-out image signal Sp obtained by preliminary read out from a current radiation image as shown in FIG. 4A which is to be compared with the past radiation image and which is recorded with radiation of a different dose and a different quality. The preliminary read-out steps from the past and current radiation images are carried out by using identical read-out conditions.

As in the case of the histogram 70, the histogram 72 is composed of a portion 72a, which is constituted of the components of the preliminary read-out image signal Sp detected from the object image portion, and a portion 72b which is constituted of the components of the preliminary read-out image signal Sp detected from the background image portions. However, the histogram 72 is obtained from the radiation image which was recorded with radiation of a quality and dose different from the quality and dose of the radiation used for recording the radiation image from which the histogram 70 is obtained. Therefore, as shown in FIG. 4C, the histogram 72 is formed at the position shifted from the histogram 70 along the horizontal axis (i.e. the Sp axis), and has a width different from the width of the histogram 70. This is because, when the quality of radiation is different, the transmittance of each portion of the object with respect to the radiation differs.

Accordingly, values Sp1, Sp2, Sp3, Sp4 and Sp5 of the components of the preliminary read-out image signal Sp, which were detected from the segments of the step-wedge image portion 9 of the past radiation image, are stored together with the information about the gradation and the sensitivity in final read out from the past radiation image. After the preliminary read-out image signal Sp has been detected from the current radiation image which is to be compared with the past radiation image, the read-out condition for final read out from the current radiation image is adjusted so as to change the sensitivity and the gradation corresponding to the past radiation image, so that values Sp1', Sp2', Sp3', Sp4' and Sp5' of the components of the preliminary read-out image signal Sp, which have been detected from the segments of the step-wedge image portion 9 of the current radiation image, are matched with the values Sp1, Sp2, Sp3, Sp4 and Sp5, i.e. so that the histogram 72 overlaps the histogram 70.

In cases where, for example, the values Sp3 and Sp3' are used for adjusting the sensitivity and Sp3' = Sp3, because the value Sp3' is already matched with the value Sp3, matching the values Sp1', Sp2', Sp4' and Sp5' respectively with the values Sp1, Sp2, Sp4 and Sp5 means that only the gradation is adjusted while the sensitivity is kept the same.

As described above, in cases where the quality and the dose of radiation are different between the past and current radiation images, the sensitivity and/or the gradation are adjusted so that the histogram obtained from the current radiation image coincides with the histogram obtained from the past radiation image.

In the aforesaid embodiment wherein the dose and the quality of radiation are different, the read-out condition for final read out is adjusted after the preliminary read-out image signal Sp is detected. However, an image processing condition may be adjusted on the basis of the preliminary read-out image signal Sp. Also, in a system wherein no preliminary read out is carried out, an image signal detected by an image read-out step which corresponds to final read out may be processed in the same manner as described above in order to adjust the image processing condition (sensitivity and gradation) to be used for image processing of the image signal.

The present invention is not limited to the aforesaid embodiments wherein a stimulable phosphor sheet is used, and is also applicable to, for example, an X-ray image read-out apparatus wherein a conventional X-ray film is used.

Figure 5:
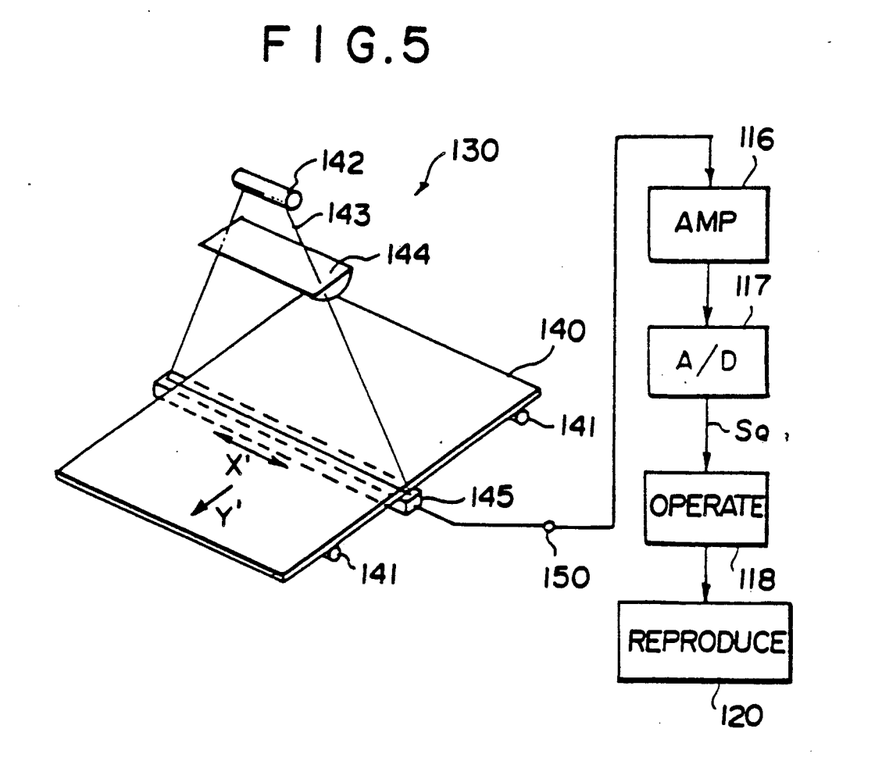
FIG. 5 is a schematic view showing an embodiment of an X-ray image read-out and reproducing apparatus in accordance with the present invention, wherein an X-ray image recorded on an X-ray film is read out and reproduced.

With reference to FIG. 5, an X-ray film 140 on which an X-ray image has been recorded is placed at a predetermined position in a read-out section 130, and is conveyed in the direction indicated by the arrow Y' by a film conveyance means 141.

Reading light 143 produced by an elongated light source 142 extending in one direction is converged by a cylindrical lens 144, and is linearly irradiated onto the X-ray film 140 in the direction indicated by the arrow X' approximately normal to the direction indicated by the arrow Y'. A MOS sensor 145 is positioned below the X-ray film 140 so that the MOS sensor 145 can receive the reading light 143 which has passed through the X-ray film 140 and the intensity of which has been modulated in accordance with the X-ray image recorded on the X-ray film 140. The MOS sensor 145 comprises a plurality of solid state photoelectric conversion devices which are arrayed linearly at intervals equal to those of picture elements of the X-ray image along the direction indicated by the arrow X'. As long as the X-ray film 140 is conveyed in the direction indicated by the arrow Y' while being exposed to the reading light 143, the MOS sensor 145 detects the reading light, which has passed through the X-ray film 140, at predetermined time intervals corresponding to the intervals of the picture elements of the X-ray image along the direction indicated by the arrow Y'.

Figure 6:
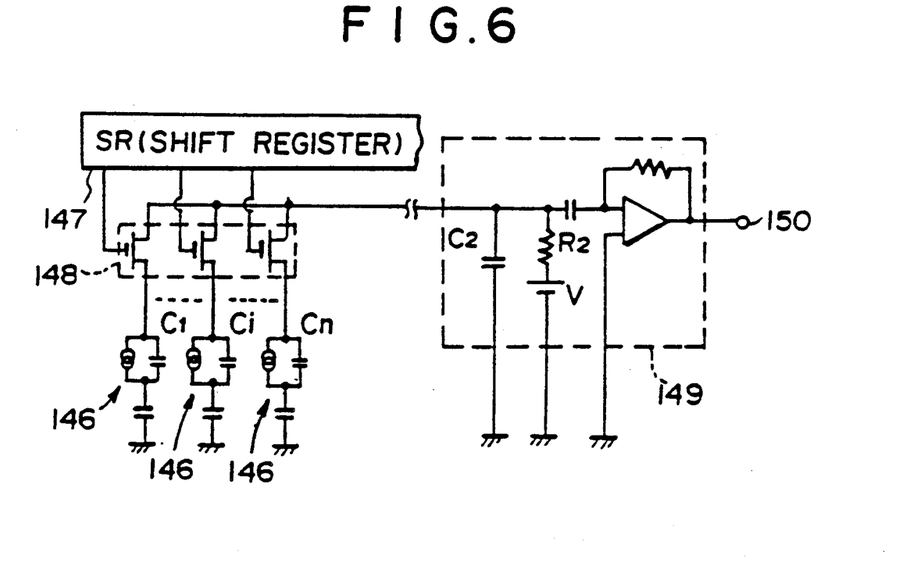
FIG. 6 is a circuit diagram showing an equivalent circuit of an MOS sensor.

FIG. 6 shows an equivalent circuit of the MOS sensor 145.

With reference to FIG. 6, photocarriers generated when the reading light 143 impinges upon the solid state photoelectric conversion devices 146, accumulated in capacitors Ci (i=1, 2, ..., n) of the solid state photoelectric conversion devices 146, 146, .... The number of photocarriers accumulated in the capacitors Ci is detected by sequentially switching a switch section 148 controlled by a shift register 147, and a time-serial image signal is obtained thereby. The image signal is then amplified by a pre-amplifier 149 and is fed out from an output terminal 150 of the pre-amplifier 149.

The analog image signal generated is fed into an operating section 118 via a logarithmic amplifier 116 and an A/D converter 117. The operating section 118 adjusts an image processing condition on the basis of the fed image signal SQ in the same manner as described above, and carried out image processing of the image signal SQ by using the image processing condition. The image-processed image signal is fed into a reproducing apparatus 120 in order to reproduce a visible radiation image from the image-processed image signal.

In the embodiment shown in FIG. 5, the MOS sensor 145 may be replaced by a charge coupled device (CCD) or a charge priming device (CPD). Also, the X-ray image may be read out from the X-ray film 140 by two-dimensionally scanning the X-ray film 140 with a light beam in the same manner as described above for image read-out from the stimulable phosphor sheet. Furthermore, instead of detecting light which has passed through the X-ray film 140, light reflected by the X-ray film 140 may be detected.

The radiation image read-out and reproducing method and apparatus in accordance with present invention are applicable widely in the course of obtaining a current reproduced image which is to be compared with a past reproduced image.

We claim:

1. A radiation image read-out and reproducing method for reading out a radiation image, carrying out image processing when necessary, and thereafter obtaining a reproduced image, wherein the improvement comprises the steps of, in the course of obtaining a second reproduced image to be compared with a first reproduced image which was obtained in the past, said first and second reproduced images having corresponding ID information:

(i) adjusting a read-out condition and/or an image processing condition, which is used for obtaining said second reproduced image, on the basis of image information corresponding to said first reproduced image whose ID information corresponds to that of said second reproduced image, so that said second reproduced image has approximately the same gradation and approximately the same sensitivity as said first reproduced image, and (ii) carrying out image read out by using the adjusted read-out condition and/or carrying out image processing by using the adjusted image processing condition.

2. A method as defined in claim 1 wherein:

(a) two radiation images from which said first reproduced image and said second reproduced image are obtained having density reference portions corresponding to each other, (b) said image information for said first reproduced image includes a density value at the density reference portion of the radiation image from which said first reproduced image was obtained, and a read-out condition and/or an image processing condition which was used for obtaining said first reproduced image, and (c) in the course of obtaining said second reproduced image, said image read out and/or said image processing is carried out by adjusting a read-out condition and/or an image processing condition, which constitutes part of said image information for said second reproduced image, so that the density value at the density reference portion of the radiation image from which said second reproduced image is obtained, becomes approximately equal to said density value which constitutes part of said image information for said first reproduced image.

3. A method as defined in claim 1 wherein said radiation image is read out from a stimulable phosphor sheet, on which the radiation image has been stored, by exposing said stimulable phosphor sheet to stimulating rays which cause it to emit light in proportion to the amount of energy stored during exposure to radiation, and photoelectrically detecting the emitted light.

4. A radiation image read-out and reproducing apparatus comprising an image read-out means for detecting an image signal by reading out a radiation image from a recording medium on which the radiation image has been recorded, an operating means for carrying out image processing of the image signal, and a reproduction means for obtaining a reproduced image by use of the image signal, wherein the improvement comprises the provision of:

(i) an ID information input means for entering ID information which gives specifics about an radiation image, (ii) an ID information storage means for storing several pieces of ID information which were entered from said ID information input means in the past, (iii) an ID information retrieval means for retrieving past ID information, which is the same as ID information currently entered from said ID information input means, from the ID information stored in said ID information storage means, and means operable in response to said past ID information retrieved by said ID information retrieval means, for adjusting a read-out condition to be used for detecting an image signal from a recording medium in said image read-out means and/or an image processing condition to be used for carrying out image processing of the image signal in said operating means on the basis of image information which corresponds to said past ID information, so as to be able to obtain a second reproduced image having approximately the same gradation and approximately the same sensitivity as a first reproduced image which has been obtained by said reproduction means and which corresponds to said past ID information, whereby the image read out for obtaining said second reproduced image is carried out using the adjusted read-out condition and/or image processing for obtaining said second reproduced image is carried out using the adjusted image processing condition.

5. An apparatus as defined in claim 4 wherein:
(a) a first radiation image from which said first reproduced image is obtained and a second radiation image from which said second reproduced image is obtained have density reference portions corresponding to each other,
(b) said image information for said first reproduced image includes a density value at the density reference portion of the first radiation image from which said first reproduced image was obtained, and a read-out condition and/or an image processing condition which was used for obtaining said first reproduced image, and
(c) said image read-out means and said operating means include, respectively, means for adjusting a read-out condition and/or an image processing condition, which constitutes part of said image information for said second reproduced image, so that the density value at the density reference portion of the second radiation image, from which said second reproduced image is obtained, becomes approximately equal to said density value which constitutes part of said image information for said first reproduced image.

6. An apparatus as defined in claim 4 wherein said recording medium is a stimulable phosphor sheet on which a radiation image has been stored, said apparatus including means for exposing said stimulable phosphor sheet to stimulating rays which cause it to emit light in proposition to the amount of energy stored during exposure to radiation, and means for photoelectrically detecting the emitted light.

* * * * *